United States Patent [19]
Lerner et al.

[11] Patent Number: 5,559,067
[45] Date of Patent: Sep. 24, 1996

[54] MODIFIED MICROSPHERE FCC CATALYSTS AND MANUFACTURE THEREOF

[75] Inventors: Bruce A. Lerner, Plainsboro; David M. Stockwell, Middlesex; Rostam J. Madon, Flemington, all of N.J.

[73] Assignee: Engelhard Corporation, Iselin, N.J.

[21] Appl. No.: 414,071

[22] Filed: Mar. 31, 1995

[51] Int. Cl.$^6$ .................................................. B01J 29/06
[52] U.S. Cl. .................. 502/68; 502/64; 502/65; 502/79
[58] Field of Search .................... 502/64, 65, 68, 502/79

[56] References Cited

U.S. PATENT DOCUMENTS

| | | | |
|---|---|---|---|
| 3,957,689 | 5/1976 | Ostermaier et al. | 252/455 |
| 4,493,902 | 1/1985 | Brown et al. | 502/65 |
| 4,716,136 | 12/1987 | Weisz et al. | 502/64 |
| 4,965,233 | 10/1990 | Speronello | 502/65 |
| 5,023,220 | 6/1991 | Dight et al. | 502/65 |
| 5,395,809 | 3/1995 | Madon et al. | 502/68 |

FOREIGN PATENT DOCUMENTS 0135317  3/1985  European Pat. Off. .

OTHER PUBLICATIONS

Oxides and Hydroxides of Aluminum; K. Wefers et al.; Alcoa Technical Paper No. 19; ALCOA Laboratories 1987(no month) Fig. 4.1.

Fluid Catalytic Cracking: Science and Technology. Studies in Surface Science and Catalysis; Magee et al. vol. 79, 1993(no month) pp. 41–43.

Bull. of the Chem. Soc. of Japan vol 49, 1976 pp. 1788–1793(no month).

Applied Catalysis vol 38, 1988(no month) pp. 143–155.

*Primary Examiner*—Michael Lewis
*Assistant Examiner*—Thomas G. Dunn, Jr.
*Attorney, Agent, or Firm*—Inez L. Moselle

[57] ABSTRACT

An in situ process for making improved zeolitic fluid cracking catalyst by spray drying a mixture of hydrous kaolin, gibbsite and spinel, essentially free from metakaolin, calcining the resulting microspheres to convert the hydrous kaolin to metakaolin whereby the gibbsite is hydrothermally converted to a transitional alumina, and reacting the microspheres composed of a mixture of spinel, transitional alumina and metakaolin with a seeded alkaline sodium silicate solution.

14 Claims, 1 Drawing Sheet

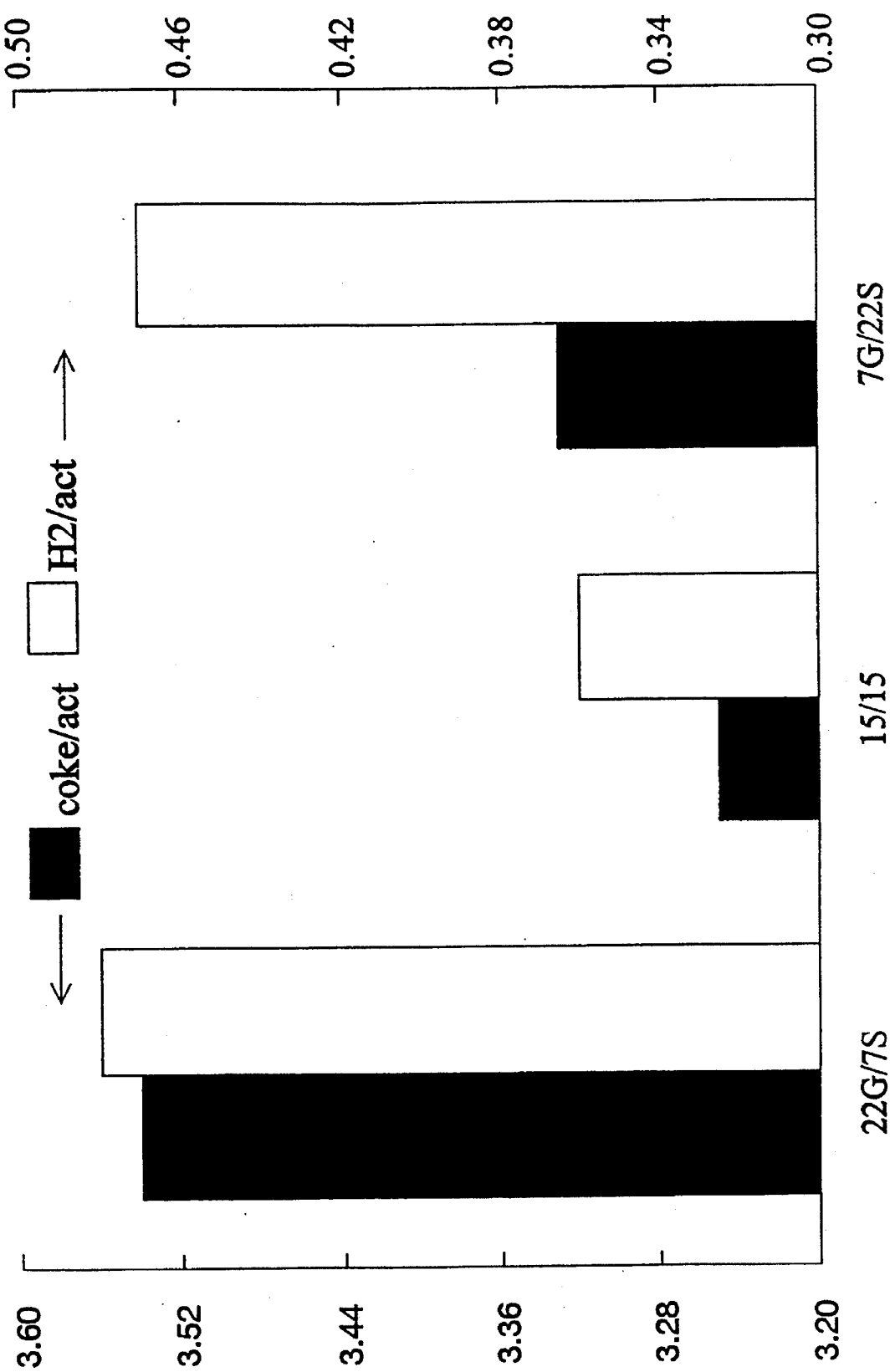

MODIFIED MICROSPHERE FCC CATALYSTS AND MANUFACTURE THEREOF

FIELD OF THE INVENTION

This invention relates to improvements in zeolitic fluid cracking catalysts (FCC) produced by an in situ reaction wherein preformed microspheres obtained by calcining microspheres composed of a mixture of hydrated kaolin clay, gibbsite (alumina trihydrate) and the "spinel" form of calcined kaolin clay, undergo chemical reaction with sodium silicate solution to form crystals of zeolite and a porous silica/alumina matrix in substantially the same size and shape as the starting microspheres. The catalyst is metals tolerant, has good catalytic selectivity and is especially useful as a "resid" catalyst.

BACKGROUND OF THE INVENTION

For many years a significant proportion of commercial FCC catalysts used throughout the world have been made by in situ synthesis from precursor microspheres containing kaolin that had been calcined at different severities prior to formation into microspheres by spray drying. One form of the calcined kaolin clay is referred to as metakaolin. The other form, obtained by calcination at a higher temperature, is referred to as spinel (or, alternatively, as kaolin calcined through the characteristic kaolin exotherm or fully calcined kaolin). Generally, these in situ fluid cracking catalysts microspheres composed of zeolite Y and an alumina rich silica-alumina matrix derived from calcined clay. It is well known that properties of the matrix can have a profound impact on the properties and performance of a zeolitic cracking catalyst. This is particularly true for in situ cracking catalysts where the zeolite Y is grown directly on/in the microsphere and is intimately associated with the matrix material.

Certain catalysts are made by the in situ route with microspheres which initially (before calcination and crystallization) contain a hydrous kaolin clay to spinel weight ratio between 40:60 to 50:50; the microspheres are then calcined at a temperature below the exotherm to convert the hydrous clay component to metakaolin. These catalysts will be referred to herein as type A catalysts. Another type of catalyst is made by spray drying hydrous kaolin microspheres, whereby calcined microspheres contain only metakaolin; spinel is not present. These catalysts will be referred to herein as type B catalysts.

The catalytic properties of such catalysts are influenced by the starting microspheres from which they are made. Type B catalyst has lower coke and dry gas selectivities than type A catalyst, but it is difficult to reduce sodium to low levels during manufacture and, in the absence of rare earth cations, it is not as stable as Type A. Type B catalyst also does not have as good a bottoms upgrading capability as Type A catalyst. The latter is more and easier to process than Type B catalyst but has a higher dry gas and coke selectivity.

See U.S. Pat. No. 4,493,902 for typical procedures used to make catalysts such as Type A catalysts using raw uncalcined (i.e., hydrated) kaolin and spinel as spray dryer feed, followed by calcination of the spray dried microspheres to convert the raw kaolin component to metakaolin and subsequent crystallization by reacting the microspheres in a seeded sodium silicate solution. The production of Type B catalysts is similar and involves using only raw uncalcined kaolin as spray dryer feed, whereby calcination of the resulting microspheres results in microspheres in which essentially all of the calcined kaolin is present in metakaolin form.

U.S. Pat. No. 5,395,809 describes improved catalysts that are more stable and easier to process than the microspheres used to produce Type B catalysts, yet substantially retain the selectivity benefits of Type B catalysts, while having bottoms upgrading capability similar to Type A catalyst but with lower coke and dry gas selectivities.

Applicants of said patent found that the proportions of hydrous clay and fully calcined clay contained in the microsphere prior to in situ zeolite growth will significantly affect the properties and performance of the resulting catalyst. Furthermore, they found that the resulting properties and performance attributes such as coke yield, bottoms upgrading, metals resistance, zeolite stability, activity and ease of sodium removal did not vary linearly with the proportions of hydrous clay and fully calcined clay. As a result there was a certain range or window where all or most of the desirable properties and performance attributes were at or near optimal. Applicants found that the boundaries of this window were defined by the weight ratio of hydrous kaolin to spinel and were approximately 90:10 to 60:40.

The preferred method for making such catalysts involved initially preparing microspheres composed of combinations of hydrous clay and spinel such that the initial hydrous clay content, expressed as weight percent, was greater than the spinel content and the microspheres, at this point of the process, were essentially free from metakaolin. The microspheres also contained a silica binder, usually greater than 5 wt % of the spray dried particles. The silica binder was provided by the addition of an alkaline sodium silicate solution. The microspheres were calcined at a predetermined temperature to convert the hydrous clay to metakaolin without significantly altering the spinel level. In situ Y zeolite FCC catalysts were then made from these microspheres by subsequent crystallization in a seeded sodium silicate solution and ion exchanged to reduce sodium level. These catalysts (hereinafter Catalyst C) were more stable and as active as Type B catalyst. Furthermore, sodium could be removed more easily during manufacture than with Type B catalyst. Also, Catalyst C had low coke and dry gas selectivities, similar to those of Type B catalysts. The ease of sodium removal and high activity with concurrent low dry gas and coke yields made these modified microsphere catalysts excellent candidates for high octane catalysts, high isobutylene catalysts and improved (compared to Type B) bottoms upgrading catalysts.

In recent years the oil refining industry has shifted to processing a larger quantity of resid due to the changing product slate and price structure of crude oil. Since the early 1980's many refiners have been processing at least a portion of residual oil as a feedstock in their units and several now run a full residual oil cracking program. Processing resid can drastically alter yields of valuable products relative to a light feed in a negative direction.

Several factors are important to resid catalyst design. It is highly favorable if the catalyst can upgrade bottoms, minimize coke and gas formation, maximize catalyst stability, and minimize deleterious contaminant selectivity due to metal contaminants in resid feedstocks such as nickel and vanadium. While catalysts A, B & C are commercially valuable, none of these in situ catalysts possessed such a combination of properties when used to crack resid feedstocks.

Following the inception of catalytic cracking by Houdry in the early 1900's where an acid treated clay was used, the first revolution in the art of catalyst technology was the use of synthetic silica-alumina. The use of silica-alumina which had much more acidic Bronsted and Lewis acid sites increased the cracking activity and selectivity of the process over the clays. The second revolution came with the advent of zeolites and the discovery that they could be applied to cracking. The clear advantage of the zeolite was that the non-selective cracking to coke and gas was greatly reduced owing to the discrete pore structure of the crystalline zeolite and the shape selective chemistry which they provided. With the thrust in modern refining to limit the amount of coke and gas so as to maximize gasoline production the designed use of silica-alumina in cracking catalysts has decreased (see A. A. Avidan in: *Fluid Catalytic Cracking: Science and Technology*.Studies in Surface Science and Catalysis vol. 76. Magee, J. S. and Mitchell, M. M. Eds.; Elsevier, Amsterdam; 1993). The use of added aluminas has also found merit in helping to boost a catalyst's activity since pure aluminas also posses acidic sites. The relative activity of a catalyst is roughly proportional to the total quantity of acid sites present. Unfortunately alumina characteristically contains a large fraction of Lewis acid sites relative to Bronsted type sites. Lewis sites have been shown to be largely involved in the chemistry of hydride abstraction and coke formation (see Mizuno et al. in Bulletin of the Chemical Society of Japan vol 49, 1976, pg. 1788–1793).

Fluid cracking catalysts which contain silica- alumina or alumina matrices are termed catalysts with "active matrix". Catalysts of this type can be compared with those containing untreated clay or a large quantity of silica and which are termed "inactive matrix" catalysts. Work done by Otterstedt etal. (Applied Catalysis vol 38, 1988, pg. 143–155.) clearly shows the disadvantage of active matrices for coke and gas production sometimes producing twice as much as the inactive formulation.

Aluminas have long been used in hydrotreating and reforming catalyst technology (see P. Grange in Catalysis Reviews- Science and Engineering vol.21, 1980, p. 135.). Aluminas, and particularly transition aluminas, in addition to displaying acidic character also posses high surface areas typically on the order of several hundred meters squared per gram. They may be well suited for catalyst applications such as those mentioned where a metallic component is to be supported on the substrate surface (alumina in this case). The high surface area of the host material allows for a more uniform, dispersed arrangement of the metal. This leads to smaller metal crystallites and helps to minimize metal agglomeration. Metal agglomeration or sintering is a leading cause of loss of activity since the activity for metal catalyzed reactions is proportional to the exposed metal surface area. When the metal "balls up" metallic surface area is lost and so is activity. In relation to catalytic cracking, despite the apparent disadvantage in selectivity, the inclusion of aluminas or silica-alumina has been beneficial in certain circumstances. For instance when processing a hydrotreated/demetallated vacuum gas oil (hydrotreated VGO) the penalty in non-selective cracking is offset by the benefit of cracking or "upgrading" the larger feed molecules which are initially too large to fit within the rigorous confines of the zeolite pores. Once "precracked" on the alumina or silica-alumina surface, the smaller molecules may then be selectively cracked further to gasoline material over the zeolitic portion of the catalyst. While one would expect that this precracking scenario might be advantageous for resid feeds they are unfortunately characterized for the most part as being heavily contaminated with metals such as nickel and vanadium and to a lesser extent, iron. When a metal such as nickel deposits on a high surface area alumina such as those found in typical FCC catalysts, it is dispersed and participates as highly active centers for the catalytic reactions which result in the formation of contaminant coke (contaminant coke refers to the coke produced discretely from reactions catalyzed by contaminant metals). This additional coke exceeds that which is acceptable by refiners.

SUMMARY OF THE INVENTION

The present invention addresses the problem of providing a resid FCC catalyst made by the in situ route which can upgrade bottoms, minimize coke and gas formation, maximize catalyst stability and minimize deleterious contaminant selectivity due to contaminant metals. While other technology exists which also provides catalysts having such a combination of performance characteristics when used to crack resids, none has been prepared via the in situ manufacturing process which has satisfactory or competitive qualities to those intended for resid processing prepared by the incorporation manufacturing route. Furthermore, some prior art technologies for achieving metals tolerance, such as those involving use of antimony, are costly and/or create environmental concerns. The present invention is relatively inexpensive to practice and does not result in the use of environmentally toxic additives.

Another aspect of the present invention comprises novel in situ produced fluid catalytic cracking catalysts with a combination of desirable properties.

Preparation of the novel fluid cracking catalyst, in accordance with an aspect of this invention, involves an initial step of preparing microspheres comprising hydrous kaolin clay, gibbsite (alumina trihydrate), spinel, and a silica sol binder, preferably an aluminum stabilized silica sol binder. These binders are frequently referred to as alum buffered silica sols. The microspheres are calcined to convert the hydrous kaolin component to metakaolin. The spray dried microspheres must be washed before calcination to reduce the sodium content if the sol binder contains a water soluble source of sodium, such as sodium sulfate. Thus, using the preferred aluminum stabilized silica sol binder, washing should take place before calcination. The calcined microspheres are reacted with an alkaline sodium solution in the presence of such silicate to crystallize zeolite Y and ion-exchanged.

During the conversion of hydrous kaolin to metakaolin, gibbsite also undergoes transformation to a transition alumina. Transition alumina may be defined as any alumina which is intermediate between the thermodynamically stable phases of gibbsite, bayerite, boehmite, and nordstandite on one end of the spectrum and alpha alumina or corrundum on the other. In as such transition aluminas may be viewed as metastable phases. A scheme of the transformation sequence can be found in the text: Oxides and Hydroxides of Aluminum by K. Wefers and C. Misra.; Alcoa Technical Paper No. 19, revised; copyright Aluminum Company of America Laboratories 1987.

Typical catalysts of the invention have the following analysis on a volatile-free weight basis.

|  | Range | Preferred |
|---|---|---|
| $Na_2O$, % | 0.05–0.6 | 0.25–0.4 |
| REO, % | 0.1 to 12 | 0.5–7 |
| $Al_2O_3$, % | 10 to 70 | 50 to 55 |
| $SiO_2$, % | 30 to 70 | 40 to 50 |

Total crystallized surface area (TSA) is at least 300 $m^2g$. Typically, crystallized TSA is about 400–410 $m^2/g$ or greater but not more than 500–550 $m^2g$.

Matrix surface area (MSA) is no greater than 125 $m^2g$; typical value is 70–80 $m^2g$.

Typical catalysts of the invention have a total pore volume (nitrogen method) in the range of 0.09 to 0.25 cc/g. It is within the scope of the invention to produce variants having smaller or larger pore volumes.

X-ray diffraction patterns reveal the presence of zeolite Y but no discrete alumina or spinel phases. It is conceivable that any alumina phases are either masked by the overwhelming zeolite Y pattern or could not be resolved by conventional x-ray diffraction or are amorphous.

It was totally unexpected that favorable catalytic attributes could be achieved from the combination of a high surface area alumina such as gibbsite with a high surface area alumina-rich silica-alumina such as the caustic leached spinel present in the catalyst. Both have been found to catalyze negative, deleterious reactions (coking and hydrogen formation, leading to poor FCC selectivity).

Hence, it was completely unexpected that the final catalyst product provided a material which had a lower coke and lower gas yield in the presence of metal contaminants compared to either an in situ catalyst material prepared from microspheres containing gibbsite without spinel and an in situ catalyst containing spinel without gibbsite.

A potential use and advantage of catalysts of this invention is in the fluid catalytic cracking of high metals feedstocks, particularly resid feeds containing nickel, vanadium or both.

BRIEF DESCRIPTION OF THE DRAWING

The accompanying figure is a bar chart which represents the coke and hydrogen yields for three catalyst samples, all prepared by in situ synthesis, which differ in the proportions of gibbsite and spinel but which all have the same total fraction of added matrix components (gibbsite plus spinel= 30 wt. %).

DETAILED DESCRIPTION

Catalysts of the invention are made by spray drying a mixture of hydrated kaolin, spinel and gibbsite alumina and silica sol binder. Preferably, the pH of the slurry that is spray dried is acidic, i.e., pH of 3–4. The spray dried microspheres are washed and then calcined to form precursor porous microspheres in which the major constituent, kaolin, is converted to metakaolin. The binder should have a majority of its bulk chemical analysis as silica. An additional requirement is that any binder which is used contain only sodium, expressed as $Na_2O$, which is easily exchangeable. A preferred binder would be an aluminum stabilized silica sol. High purity silica sol can be used but may be ruled out by economic consideration. If a conventional binder such as sodium silicate were used, the slurry that is spray dried would be strongly alkaline. Sodium not completely exchangeable by water washing would cause the gibbsite to be fused during the calcination treatment to convert the hydrous kaolin to metakaolin. This would create intolerable species such as sodium aluminates.

The precursor microspheres are reacted with seeds and an alkaline sodium silicate solution, substantially as described in U.S. Pat. No. 5,395,809, the teachings of which are incorporated herein by cross-reference. The microspheres are crystallized to a desired zeolite content (typically ca. 50%–65%), filtered, washed, ammonium exchanged, exchanged with rare-earth cations if required, calcined, exchanged a second time with ammonium ions, and calcined a second time if required.

Especially preferred compositions of the solids in the slurries that are spray dried to form porous microspheres, and later calcined to prepare precursor microspheres, are expressed hereinafter below in table form as the weight percent of hydrated kaolin, gibbsite and kaolin calcined through the exotherm (spinel) on a binder-free basis; weight % $SiO_2$ binder is based on the total weight of dry microspheres and provided by an aluminum stabilized silica sol.

| Ingredients | Preferred | Especially preferred |
| --- | --- | --- |
| Hydrated Kaolin | 40–90 | 65 |
| Gibbsite Alumina* | 1–30 | 15 |
| Kaolin calcined through the exotherm | 1–30 | 15 |
| Aluminum stabilized silica sol Binder | 5–25 | 5 |

*Weight of gibbsite is reported on a volatile-free weight basis.

A commercial source of powdered kaolin calcined through the exotherm, e.g., SATINTONE® No. 1 calcined kaolin, may be used as the spinel component. Preferably, large, coarse hydrated kaolin clay, such as NOKARB® kaolin, is converted to this state by calcining the kaolin at least substantially completely through its characteristic exotherm. (The exotherm is detectable by conventional differential thermal analysis, DTA.) For example, a one inch bed of hydrated kaolin clay may be calcined for about 1–2 hours in a muffle furnace at a chamber temperature of about 1800°–1900° F. to produce clay that has been calcined through its characteristic exotherm, preferably without any substantial formation of mullite. During calcination, some of the finely divided clay agglomerates into larger particles. After completion of calcination, the agglomerated calcined clay is pulverized into finely divided particles before being introduced into the slurry that is fed to a spray dryer. The spray dried product is repulverized. The surface area (BET) of typical spinel form kaolin is low, e.g., 5–10 $m^2/g$; however, when this material is placed in a caustic environment such as that used for crystallization, silica is leached, leaving an alumina-rich residue having a high surface area, e.g. 100–200 $m^2/g$ (BET).

The gibbsite crystals used in practice of this invention are preferably ground to an average particle size less than 5 microns; surface area is 150–275 $m^2/g$ after activation by heating at temperatures suitable for converting hydrous kaolin to metakaolin. The hydrated kaolin clay component of the especially preferred feed slurry is either one or a mixture of ASP® 600 kaolin (80% by weight finer than 2 microns) or ASP® 400 kaolin (about 60% by weight finer than 2 microns). Preferably, all the clay, hydrated and calcined, is a low iron content, purified grade of clay. Purified water-processed kaolin clays from Middle Georgia have been used with success as the hydrated kaolin and the source of the spinel.

The aluminum stabilized silica sol binder used in practice of the invention is similar to that described by Ostermaier in U.S. Pat. No. 3,957,689, the teachings of which are incorporated herein by cross-reference.

In a preferred embodiment of the invention an aqueous slurry of finely divided hydrated kaolin clay, clay that has been calcined through its characteristic exotherm, gibbsite and silica sol binder is prepared. The finely divided gibbsite alumina is slurried in water and has added to it a sufficient quantity of an organic or inorganic acid to result in a slurry pH of 4.5–5.5 preferably 5.0–5.25. Acids such as formic, acetic, propionic, or hydrochloric, sulfuric and nitric are preferred but others may be used. To a quantity of silica sol is added hydrous kaolin and kaolin calcined through its characteristic exotherm. To this is added gibbsite slurry so that the final slurry solids are about 40–60% (weight). The order of addition of components is not critical as long as each is added to the sol under high shear mixing. The aqueous slurry is then spray dried to obtain microspheres comprising a silica bonded mixture of hydrated clay, gibbsite and clay that has been calcined at least substantially through its characteristic exotherm (spinel). The microspheres have average particle diameters that are typical of commercial fluid catalytic cracking catalysts, e.g., 65–85 microns. Suitable spray drying conditions are set forth in the '902 patent.

After spray drying, the microspheres are washed and calcined at a temperature and for a time (e.g., for two hours in a muffle furnace at a chamber temperature of about 1500°–1550° F.) sufficient to convert the hydrated clay component of the microspheres to metakaolin, leaving the spinel component of the microspheres essentially unchanged. Most preferably the calcined microspheres comprise about 43 to 82% by weight metakaolin and about 33 to 10% by weight spinel.

After crystallization by reaction in a seeded sodium silicate solution, the microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.5% and most preferably less than about 0.4%, by weight $Na_2O$. After ion exchange, the microspheres are dried to obtain the microspheres of the present invention. In order to make 0 (zero) wt % rare earth (REO) catalysts, the $Na^+$ cations are exchanged by using only an ammonium salt such as $NH_4NO_3$ and without using any rare earth salt during exchange. Such 0 (zero) wt % REO catalysts are especially beneficial as FCC catalysts that give higher octane gasoline and more olefinic product. Rare earth versions of catalysts of this invention, post treated after crystallization by ion-exchange with high levels of rare earth, e.g., by procedures such as described in the '902 patent, are useful when exceptionally high activity is sought and the octane rating of the FCC gasoline produce is not of prime importance. Rare earth levels in the range of 0.1% to 12% usually between 0.5% and 7% (weight basis) are contemplated. Following ammonium and rare earth exchange, the catalyst is calcined at 1100°–1200° F. for 1.5 hours and unit cell size of the Y zeolite is reduced. Preferably this calcination is done in a covered tray with 25% free mixture present.

"Silica Retention" may be practiced to alter porosity. The teachings of U.S. Pat. No. 4,493,902 at col. 12, l. 3–31, regarding silica retention are incorporated herein by cross-reference.

The preferred catalyst of the invention comprises microspheres containing at least 40% and preferably from 50 to 65% by weight Y-faujasite, expressed on the basis of the as-crystallized sodium faujasite form zeolite. As used herein, the term Y-faujasite shall include synthetic faujasite zeolites exhibiting, in the sodium form, an x-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique. It is important to equilibrate the microspheres carefully before x-ray evaluations are made since equilibration can have a significant effect on the results.

It is preferred that the Y-faujasite component of the microspheres, in their sodium form, have a crystalline unit cell size of less than about 24.73A and most preferably less than about 24.69A. Typically, the Y-faujasite component of the microspheres has a crystalline unit cell size range of between 24.64∝24.73A, corresponding to a $SiO_2/Al_2O_3$ molar ratio of the Y-faujasite of about 4.1–5.2.

Conditions useful in operating FCC units utilizing catalyst of the invention are well known in the art and are contemplated in using the catalysts of the invention. These conditions are described in numerous publications including Catal. Rev.—Sci. Eng., 18 (1), 1–150 (1978), which is incorporated herein by cross-reference.

The following tests were used in the accompanying illustrative examples.

X-ray patterns were obtained for the crystallized sodium form catalyst and the finished ion-exchanged catalysts using Cu-K alpha radiation furnished to a Phillips APD 3720 X-ray Diffractometer. This diffraction unit utilizes a 0.2 degree receiving slit in front of a scintillation detector and a "theta compensation" slit on the incident radiation. The effect of theta compensation is to keep a constant area irradiated on the sample which will maintain consistent data collection and enhance weak peak intensities at high 2-theta values. This process may affect peak intensity but does not effect the determination or identification of any species as it does not affect the position of peaks which are the characteristic x-ray finger print signature of crystalline materials. Other standard features of the equipment are a nickel filter and the following scan conditions: scan width=3–80 degrees 2-theta, step width=0.02 degrees 2-theta, count time=1 second.

MAT (microactivity test) is described in U.S. Pat. No. 4,493,902. Before metal impregnation, catalysts are steamed at 1450° F. for two (2) hours followed by the known Mitchell method for impregnating metals. Steaming conditions prior to catalyst testing are also referenced in U.S. Pat. No. 4,493,902 (as the "closed" system). The gas oil used in some of the tests described in this application was CTSGO 175. The properties of this gas oil are set forth in U.S. Pat. No. 5,023,220. A modification of ASTM Standard Test Method D-4365-85 was used for determining that portion of the total area of the catalyst ascribable to micropores, which may be interpreted in terms of percent zeolite and is called "zeolite area". Relative pressures (P/Po) of 0.08, 0.11, 0.14, 0.17 and 0.20 were used for collecting the data, which was used to calculate the BET-area (total surface area) and the t-area (matrix surface area) by the DeBoer t-plot method. The method used differed from the ASTM method in that lower relative pressure points were not used if a negative intercept was obtained (paragraph 10.13.1) and the formula for calculating the t-area did not include the factor 0.975 (paragraph 11.14 and 11.14.1).

Following is an example illustrating a preferred mode of practice of the invention on a batch scale. 3241 g of a dispersed slurry of hydrous clay @ 57% solids (moisture-free weight basis) with pH approximately 7, was mixed under high shear into 1429 g of an aluminum stabilized silica hydrosol (10.5% $SiO_2$ solids (on a volatile free, salt free weight basis). To this was added 1800 g of a slurry of finely divided gibbsite @ 25% solids (moisture free weight basis); pH was adjusted to 5–6 with formic acid and 450 g of dry spinel was added. The mixture was spray dried. After spray drying, the microspheres were washed with 3×1000 ml portions of water and air dried. The microspheres were subsequently calcined in a muffle oven at 1500° F. for 2 hours. The microspheres were crystallized by adding the following reagents to 100 g of microspheres: N® Brand sodium silicate solution (355 g), 50 % NaOH solution (44 g), seeds (78.5 g), and water (126 g). After 16–20 hours @ 210°–212° F with stirring, the microspheres were filtered and washed with a copious amount of water. The microspheres contained zeolite Y as determined by using the aforementioned x-ray techniques and by competition to a known standard. The microspheres were then base exchanged once by adding a 1.5 fold excess over the catalyst weight of ammonium nitrate solution (54 wt. %) at 180° F. with stirring for 15 minutes and maintaining the pH between 2.5 and 4.0. This was followed by two 1:1 exchanges at the same conditions. The microspheres were then exchanged with rare earth nitrate solution (approximately 25% REO) at 180° F. with stirring for 30 minutes. The microspheres were filtered and dried and then calcined at 1150° F. for 1.5 hours in a covered tray and 25% moisture. The microspheres were then base exchanged several times in accordance with the above conditions and a 1:1 ratio by weight of microspheres and ammonium nitrate solution. This base exchange treatment was repeated until the sodium level was below 0.5% wt % (as $Na_2O$). The properties of the microspheres after this base exchange procedure were $Na_2O$=0.19%, REO=1.00%, TSA=398 $m^2/g$, ZSA=289 $m^2/g$, MSA=109 $m^2/g$.

The microspheres were again calcined as above to make the final working catalyst. Its properties after calcination were: $Na_2O$=0.19%, REO=1.00%, TSA=378 $m^2/g$, ZSA= 256 $m^2/g$ MSA=122 $m^2/g$ 46% ZY with a 24.46 A UCS Attempts were made to produce FFC catalysts by an in situ route by spray drying hydrous kaolin and gibbsite. No spinel was present. A conventional binder, sodium silicate, was used. This was followed by spray drying, calcination to convert hydrous kaolin to metakaolin, crystallization by reaction with sodium silicate in the presence of seeds, followed by ion-exchange with ammonium salt. An acceptable catalyst could not be prepared due to the inordinate amount of sodium which was retained in the microspheres as a result of sodium fixation on alumina during calcination to convert hydrous clay to metakaolin. During steaming this retained sodium was liberated and destroyed the zeolite; the catalytic data was therefore meaningless.

The accompanying bar chart represents the coke and hydrogen yields for three catalyst samples which differ in the proportions of gibbsite and spinel Coke was determined by subjecting the spent catalyst from the MAT test to a LECO carbon analysis and then assuming that coke is represented as CH. The actual carbon is multiplied by 13/12 then multiplied by 6 (the sample weight) and then multiplied by 1.2 (the oil weight). Hydrogen was determined by gas chromatographic analysis. Peak area was related to weight percent by using response factors determined from standardization. Activity was determined from the MAT conversion by the definition which relates activity and observed conversion: activity=conversion/(100-conversion) (wt %).

The results reported in the bar chart show that there is an optimum formulation which is centered at 15/15 (or equal parts gibbsite and spinel) where the weight of gibbsite is on a volatile-free alumina basis. It should be recognized that while certain formulations are better than others that the poorer performing iterations are still better than competitive materials.

Data for all spinel (no gibbsite) version of this material for the same test conditions are as follows:

coke/activity=4.9 hydrogen/activity–0.6

While the present invention has been particularly set forth in terms of specific embodiments thereof, it will be understood that the variations are enabled to those skilled in the art and reside within the present teachings.

We claim:

1. A zeolitic fluid catalytic cracking catalyst having reduced coke yield and produced by the steps comprising:
    (a) forming an aqueous slurry containing about 40 to 90 parts by weight hydrated kaolin clay, about 1 to 30 parts by weight gibbsite, and about 1 to 30 parts by weight kaolin clay that has been calcined through its characteristic exotherm, and a silica binder;
    (b) spray drying the aqueous slurry to obtain microspheres and then washing them substantially free of sodium unless the silica binder is substantially free of sodium;
    (c) calcining the microspheres obtained in step (b) at a temperature and for a time sufficient to convert the hydrated kaolin clay in the microspheres substantially to metakaolin, but insufficient to cause metakaolin or hydrated kaolin to undergo the characteristic kaolin exotherm;
    (d) mixing the microspheres obtained in step (c) with a solution comprising sodium silicate to obtain an alkaline slurry; (e) heating the slurry of microspheres of calcined clay to a temperature and for a time sufficient to crystallize at least about 40% by weight Y-faujasite in the microspheres, said Y-faujasite being in the sodium form; (f) and ion-exchanging the microspheres from step (e) to reduce the sodium content.

2. The catalyst of claim 1 wherein the binder is a silica sol.

3. The catalyst of claim 1 wherein said binder is an aluminum stabilized silica sol.

4. The catalyst of claim 1 wherein the clay that has been calcined at least substantially through its characteristic exotherm contains substantially no mullite.

5. The catalyst of claim 1 wherein the gibbsite and the kaolin calcined through the exotherm are present in amount of about 15 parts by weight to about 65 parts by weight hydrated kaolin clay in step (a).

6. The catalyst of claim 1 in which the binder level, expressed as $SiO_2$, is between about 2 to 25 wt % of the microspheres in step (a).

7. The catalyst of claim 1 in which the binder level as $SiO_2$ is about 5 wt % of the microspheres in step (a).

8. The catalyst of claim 1 which has a total nitrogen pore volume in the range of 0.09 and 0.25 cc/g.

9. A method for making a high zeolite content fluid catalytic cracking catalyst comprising the steps of:
    (a) forming an aqueous slurry containing about 40 to 90 parts by weight hydrated kaolin clay, about 1 to 30 parts by weight gibbsite, about 1–30 parts by weight kaolin clay that has been calcined through its characteristic exotherm, and an aluminum stabilized silica sol binder, said slurry being substantially free from metakaolin and having a pH below 7;

(b) spray drying the aqueous slurry to obtain microspheres and washing the microspheres until they are substantially free of sodium;

(c) calcining the microspheres obtained in step (b) at a temperature and for a time sufficient to convert the hydrated kaolin clay in the microspheres substantially to metakaolin, but insufficient to cause metakaolin or hydrated kaolin to undergo the characteristic kaolin exotherm;

(d) mixing the microspheres obtained in step (c) with sodium silicate, sodium hydroxide and water to obtain an alkaline slurry; and (e) heating the slurry of microspheres of calcined clay to a temperature and for a time sufficient to crystallize at least about 40% by weight Y-faujasite in the microspheres, said Y-faujasite being in the sodium form.

10. The method of claim 9 wherein from 50 to 65% by weight Y-faujasite is crystallized in the microspheres in step (e).

11. A method of claim 9 including the steps of:

(f) separating the microspheres containing at least 40% by weight Y-faujasite from at least a major portion of its mother liquor;

(g) replacing sodium cations in the microspheres separated in step (e) with ammonium ions or ammonium ions and thereafter rare earth ions;

(h) calcining the microspheres from step (a) to facilitate release of sodium ions;

(i) further exchanging the microspheres with ammonium ions to reduce $Na_2O$ content to below 1%; and (j) further calcining the microspheres to reduce the unit cell size of the zeolite.

12. The method of claim 11 in which the rare earth content expressed as rare earth oxide, REO, is between 0.1 wt % and 12 wt %.

13. The method of claim 11 in which the rare earth content expressed as rare earth oxide, REO, is between 0.5 wt % and 7 wt %.

14. The process of claim 9 in which the sodium content expressed as $Na_2O$ is between 0.05 and 1.0 wt %.

* * * * *